United States Patent Office 2,724,900
Patented Nov. 29, 1955

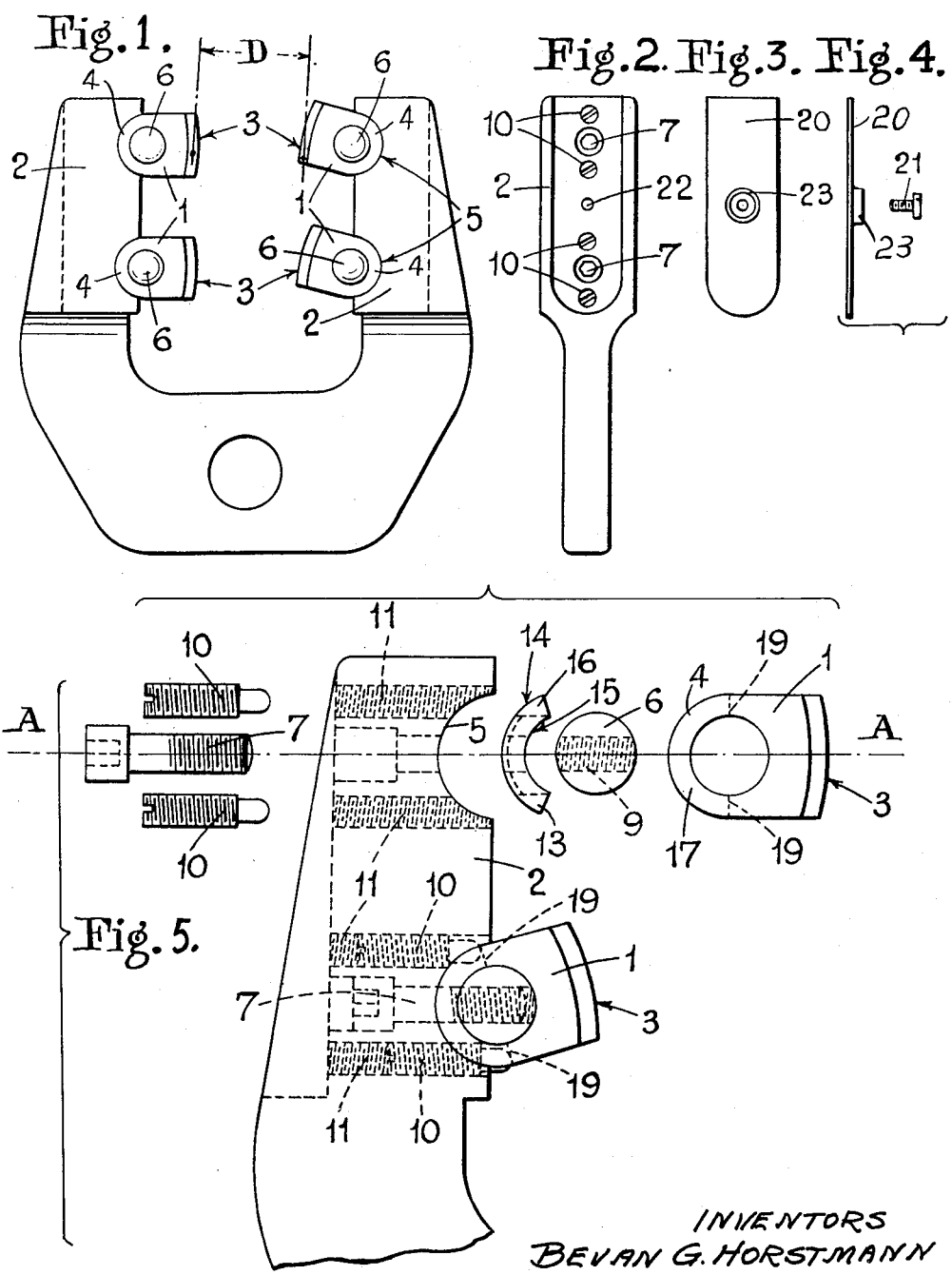

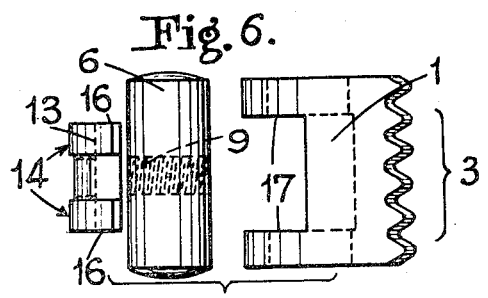
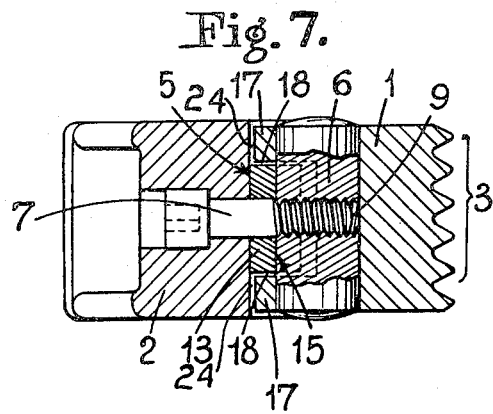

2,724,900

THREAD GAUGE

Bevan Graham Horstmann and Swinfen Henry Stevenson, Bath, England

Application September 16, 1952, Serial No. 309,782

Claims priority, application Great Britain October 29, 1951

3 Claims. (Cl. 33—199)

This invention relates to gauges and especially to caliper gauges having adjustable gauging members or anvils pivoted opposite one another in the gauge jaws and one at least of which has a gauging surface eccentric to the pivot. The invention comprises an improved construction for such gauges, which is adapted for gauging threaded bodies, for which purpose the gauge is provided with means whereby the gauging anvil is permitted, in addition to its angular adjustment, a limited axial adjustment by which the anvil can move in this direction when the threaded body is applied between the anvils of a pair so that no interference is obtained from the helix angles of the body and gauge.

The invention will be fully understood from the following more detailed description of one embodiment of the invention, reference being made to the accompanying drawings in which:

Figure 1 is a side elevation of a complete caliper gauge according to the invention.

Figure 2 is an end elevation of the same but having a cover-plate removed;

Figures 3 and 4 are two views of the cover-plate;

Figure 5 is a view corresponding to Figure 1 but drawn to a large scale and showing only one of the jaws of the gauge, one of the gauging members or anvils and associated parts carried by this jaw being shown detached or "exploded" to show the construction of its separable parts;

Figure 6 is a plan view of certain of the parts shown in Figure 5, and

Figure 7 is a section taken on the line "A—A" of Figure 5 but showing the parts assembled in operative positions.

In the embodiment of the invention illustrated in the drawings the gauge has two pairs of anvils 1 but only one pair may be provided—the anvils of each pair being pivoted opposite one another in the gauge jaws 2. One or each anvil of each pair is formed with a curved gauging surface 3 eccentric to its pivotal axis so that the effective distance between each pair of gauging surfaces 3 (for instance the distance marked D in Figure 1) can be adjusted by angular adjustment of the anvils. The gauging surface 3, as shown, is provided with teeth or partial threads for engagement with the threaded body to be gauged.

Opposite the eccentric gauging surface 3, the anvil 1 is provided with a radiused heel 4 which fits into a concave part-cylindrical bearing socket 5 provided for it in the jaw 2, the mutually contacting surfaces of the heel 4 and bearing socket 5 being coaxial with a pivot pin 6 by which the anvil 1 is pivotally attached to the jaw 2, so that it may be angularly adjusted.

Each anvil 1 has a radiused heel 13 (see Figures 5, 6 and 7), which is not formed integrally with the anvil as in the first form, but is separately fitted thereto. This separately fitted heel 13 consists of a curved plate shaped like a segment of a cylindrical shell. It has a convex cylindrical surface 14 (Figures 5 and 6) which fits closely in the bearing socket 5 provided for it in the jaw 2, a concave cylindrical surface 15 which fits closely to the pivot pin 6, and two flat end faces 16 forming stop faces. The anvil 1 is attached to the pivot pin 6 by two apertured lugs 17 formed integrally with the anvil 1 and located one on each side of the heel 13 so that they project radially into the socket 5, these lugs 17 being formed with holes which are a close sliding fit on the pivot pin 6.

The anvil 1 and separately fitted heel 13 are held in place on the gauge jaw 2 by the clamping screw 7, which passes through a hole provided for it in the jaw 2, and through a clearance hole in the heel 13, and engages in the tapped hole 9 bored diametrically through the pivot pin 6.

As has been hereinbefore indicated the construction shown is designed as a thread gauge and the purpose of having the heel 13 separately fitted is to allow the anvil 1 to have a small free axial movement on the pivot pin 6 to prevent interference by helix angles when the gauge is applied to the work. The lugs 17 are axially spaced wider than the distance between the end faces 16 and the heel piece 13 so that sufficient clearance is allowed between the heel 13 and the lugs 17 to permit this free axial movement of the anvil. The end faces 16 on the heel piece and the lugs 17 form stops by which the said axial movement is limited. This clearance is indicated at 18 in Figure 7, and it can be seen from the drawings that the clearance 18 permits the anvil 1 to move relatively to the heel 13 and jaw 2 in a direction parallel to the axis of the pin 6. It must be understood, of course, that the dimensions of the parts are such that the radial lugs 17 on the anvil are not gripped between the pin 6 and bearing surface 5 when the clamping screw 7 is tightened, that is they have radial clearance 24 in the socket 5 so that the anvil is free to slide axially on the pin 6.

The angular adjustment of the anvil 1 is set and held by two locating elements in the form of adjusting screws 10 which pass through tapped holes 11 in the jaw 2 and through the socket 5 so that their ends engage abutment surfaces 19 on opposite sides of the anvil 1. It will be noted that these setting screws 10 are not screwed hard against the abutments 19 but only up to them, thus permitting the required axial movement of the anvil described above.

To prevent unauthorised movement of the adjusting screws 10 or clamping screws 7, the heads of these screws may be covered by a plate 20 (Figures 3 and 4) adapted to be held in place by a screw 21 which engages in a tapped hole 22 provided for it in the jaw 2. The cover plate 20 is formed with a cup 23 which is adapted to receive the head of the screw 21 and is designed to be filled with a sealing wax or other material for the purpose of sealing the screw 21 in position and thus preventing unauthorised removal of the cover plate 20.

The gauge shown in Figure 1 is provided with two pairs of gauging anvils 1 for use as a combined "go" and "no go" gauge by adjusting the first pair of anvils to a dimension corresponding to the upper limit of the tolerance to be allowed and adjusting the second pair to a dimension corresponding to the lower limit. The invention is, however, applicable to gauges having only one, or more than two pairs of gauging members or anvils 1.

What we claim is:

1. A caliper gauge for threaded bodies comprising a jaw with a pair of arms facing one another, a pair of oppositely disposed gauging anvils mounted in the respective arms, at least one anvil including a pivot pin secured in the arm, a spacer element between said pivot pin and said arm, a clamping screw passing through said arm and said spacer element into said pivot pin, stop faces at opposite ends of the spacer element, radial lugs on the anvil having bearing holes receiving the pivot pin, said lugs being spaced to straddle said stop faces with a predetermined axial clearance, a toothed gauging surface on the anvil opposite to said lugs, eccentric to said pin, and facing a complementary gauging surface on the other anvil, and a setting device including locating elements adjustably mounted in said arm on either side of said pivot pin and engaging abutment surfaces on the anvil to hold the anvil with its eccentric gauging surface in a predetermined angular position with respect to the pivot pin while allowing limited axial movement of said anvil on said pin.

2. A caliper gauge for threaded bodies comprising a jaw having at least one pair of oppositely disposed and spaced gauging anvils of which one at least is mounted for angular adjustment upon a pivot pin and has a toothed gauging surface eccentric to the pin, the mounting means including a radiused heel piece separate from and engaging the anvil diametrically opposite the gauging surface, axially spaced end faces on said heel piece, a cylindrical socket in said jaw, convex and concave cylindrical surfaces on the heel piece complementary to said socket and pin respectively, a clamping screw passing through said socket and heel piece into said pin to secure the pin and heel piece in said socket, radial lugs on said anvil axially spaced wider than the end faces on said heel piece, said lugs projecting into said socket with radial clearance whereby to provide for limited axial adjustment of the anvil on the pin as determined by the co-operation of said end faces and said lugs, abutment surfaces on the anvil on either side of said pin, and a setting device including locating elements adjustably mounted in said jaw on either side of the clamping screw to engage the said abutment surfaces for holding the anvil in a required angular position while allowing the axial movement thereof.

3. A caliper gauge according to claim 1, wherein said locating elements and said clamping screw pass into said jaw from a face opposite the socket and a cover plate is provided on said face to cover the elements and the said screw, said cover plate being recessed to take the head of a securing screw and for receiving a sealing compound.

References Cited in the file of this patent

UNITED STATES PATENTS

| | | |
|---|---|---|
| 1,311,349 | Hoagland | July 29, 1919 |
| 2,367,255 | Aller et al. | Jan. 16, 1945 |
| 2,514,605 | Holmberg | July 11, 1950 |

FOREIGN PATENTS

| | | |
|---|---|---|
| 577,464 | Great Britain | May 20, 1946 |